United States Patent

[11] 3,617,102

[72] Inventors: Ryuji Wada; Masuo Nakato, both of Kariya-shi, Aichi-ken, Japan
[21] Appl. No.: 856,060
[22] Filed: Sept. 8, 1969
[45] Patented: Nov. 2, 1971
[73] Assignee: Toyda Koki Kabushiki Kaisha, Kariya-shi, Aichi-ken, Japan
[32] Priority: Sept. 17, 1968
[33] Japan
[31] 43/67057

[54] HIGH SPEED GAS BEARING STRUCTURES
6 Claims, 7 Drawing Figs.

[52] U.S. Cl. ................................................ 308/122
[51] Int. Cl. ................................................ F16c 1/24
[50] Field of Search ............................... 308/122, 9, 160

[56] References Cited
FOREIGN PATENTS
1,266,160   5/1961   France .................... 308/122

Primary Examiner—Frederick L. Matteson
Assistant Examiner—Frank Susko
Attorney—Wenderoth, Lind & Ponack ABSTRACT: In a high-speed gas bearing structure wherein a rotary shaft is rotatably journaled by a high-pressure thin gas film, there are provided means to detect the number of revolutions of the rotary shaft, a control circuit connected to the detecting means to produce an output signal when the number of revolutions of the rotary shaft reaches a substable region beyond the first resonance point and a control valve energized by the output from the control circuit to reduce the pressure of high-pressure gas supplied to the gas bearing.

PATENTED NOV 2 1971 3,617,102

RYUJI WADA and
MASUO NAKATO,
INVENTOR.

BY Wenderoth, Lind & Ponack
Attorneys

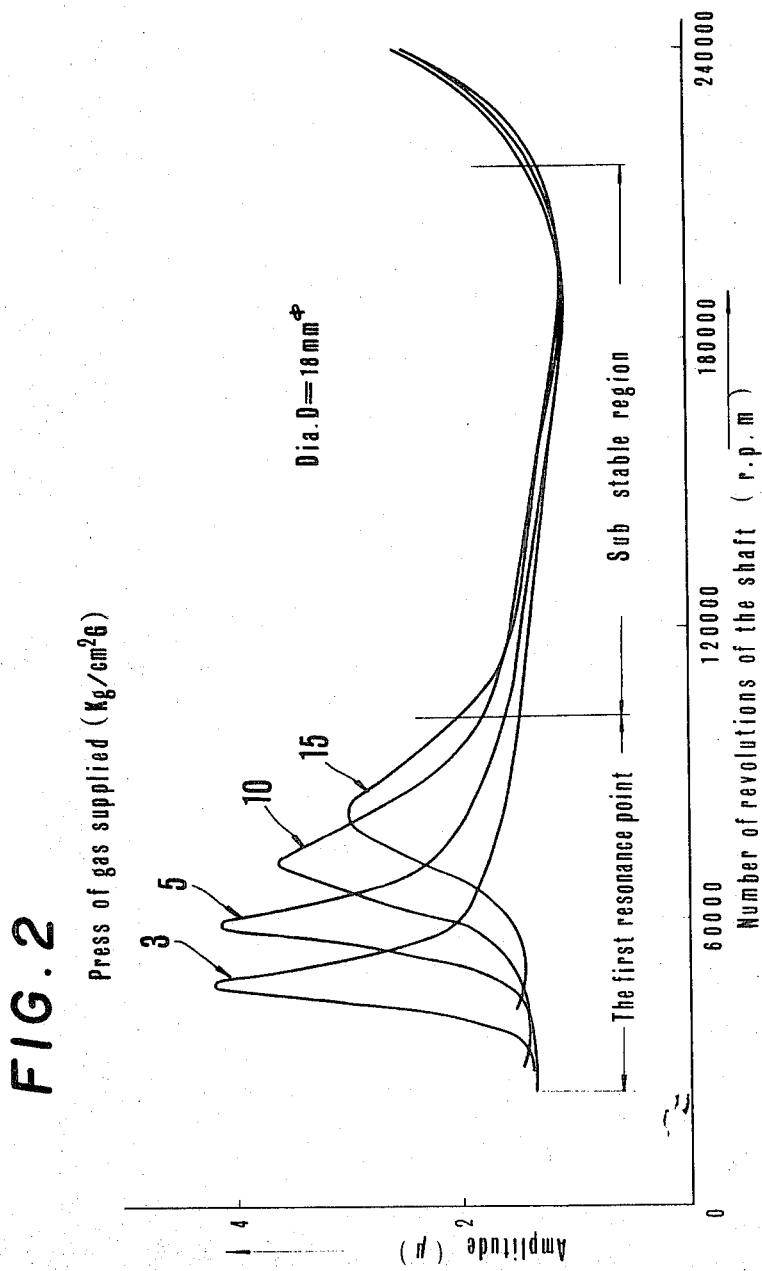

RYUJI WADA and
MASUO NAKATO,
INVENTOR.

BY Wenderoth, Lind & Ponack
Attorneys

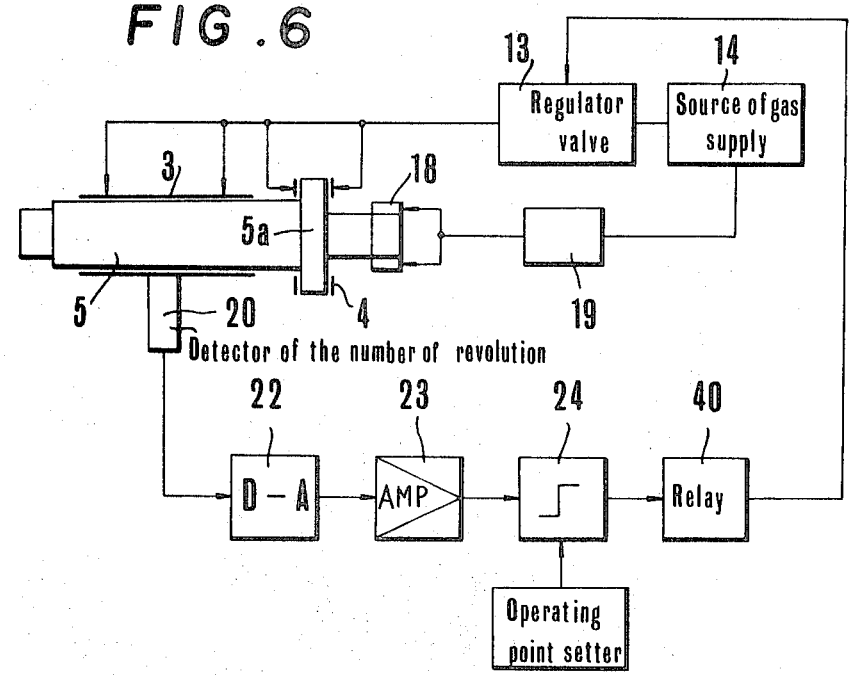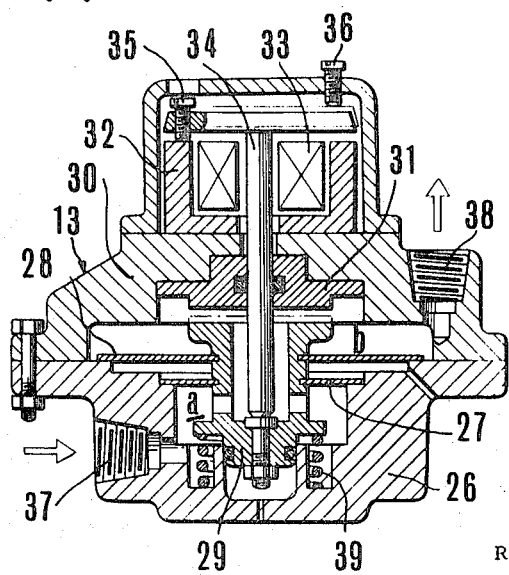

HIGH SPEED GAS BEARING STRUCTURES

BACKGROUND OF THE INVENTION

This invention relates to an improved gas-bearing structure.

For high-speed shafts rotating at an extremely high speed of the order of more than 10 to hundreds of thousands per minute, it is usual to utilize gas bearing structures having extremely low-bearing friction thus providing high rotational accuracy.

Although operation at high speeds of such rotary shafts journaled by gas bearings has not yet been analyzed the results of experiments show the following facts. More particularly, as the number of revolutions of the rotary shaft is increased, at the first resonance point, the rotary shaft exhibits a whirling motion, as shown in FIG. 1 with its axis moving on a circular path having a radius equal to the eccentricity $e$ with respect to the center O of the bearing. Consequently, under these conditions, the rotation of the shaft is very unstable thus making it impossible to attain the desired high accuracy. Moreover, this phenomenon results in metal-to-metal contact between the shaft and the bearing causing seizure and damage of the bearing structure.

Heretofore this problem has been solved by increasing the pressure of the gas supplied to the bearing structure. FIG. 2 is a plot to show the relationship between the number of revolutions of a rotary shaft of 18 mm. diameter and the amplitude of the whirling motion of the shaft (eccentricity thereof) wherein the gas pressure supplied to the bearing is taken as the parameter. As can be clearly seen from FIG. 2, increase in the gas pressure decreases eccentricity and is extremely effective. However, according to the result of experiments made up to the ultra-high-speed region, after passing through the first resonance point, the amplitude of the whirling motion of the rotary shaft becomes substantially independent of the gas pressure supplied to the bearing structure and converges to a definite value with substantially the same characteristics for any gas pressure. For this reason, it was found that where the operating range of the rotary shaft is selected to be in the substable region beyond the first resonance point, a decrease in the gas pressure supplied to the bearing structure does not cause any appreciable trouble.

SUMMARY OF THE INVENTION

The invention is based on the aforementioned result of experiments and contemplates supplying a gas to the bearing surface under a relatively high pressure until the number of revolutions of the shaft passes through the first resonance point and to decrease the gas pressure after the number of revolutions of the shaft has passed through the first resonance point into the substable region thereby to greatly decrease the amplitude of the whirling motion of the shaft at the first resonance point.

It is, therefore the principal object of this invention to decrease the eccentricity of the rotary shaft at the first resonance point to improve the accuracy of rotation thereby decreasing the quantity of gas consumed in the substable region which is substantially the operating range of the rotary shaft as well as to reduce the power for producing the compressed gas.

Another object of this invention is to detect the number of revolutions of the rotary shaft to confirm the fact that the number of revolutions has passed through the first resonance point thereby to automatically control the reduction in the pressure of the gas supplied to support the shaft.

A still further object of this invention is to provide means for effectively reducing the pressure of the gas supplied to the bearing structure in accordance with said detected signal.

Briefly stated, in accordance with this invention, in a high-speed bearing structure of the type wherein a rotary shaft is rotatably journaled in a gas bearing by a static supporting force created by a thin gas film formed between the gas bearing and the rotary shaft by a gas under pressure supplied from a source of gas supply, there are provided means to detect the number of revolutions of the rotary shaft, a control circuit responsive to the output of the detecting means to produce an output signal when the number of revolutions of the rotary shaft reaches a substable region beyond the first resonance point and a control valve responsive to the output signal to reduce the pressure of the gas supplied to the gas bearing from the source of gas supply.

BRIEF DESCRIPTION OF THE DRAWING

Further objects and advantages of the invention will become apparent from the following detailed description taken in conjunction with the accompanying drawing in which:

FIG. 2 is a plot to show the relationship between the number of revolutions of the shaft and the eccentricity thereof, the pressure of the gas supplied to the bearing structure being taken as the parameter.

FIG. 6 is a block diagram of one example of the control system embodying this invention; and FIG. 7 is a longitudinal sectional view of one example of a regulator valve.

DESCRIPTION OF THE PREFERRED EMBODIMENT

A preferred embodiment of this invention will now be described with reference to FIGS. 3 to 7 inclusive.

Figure 3:
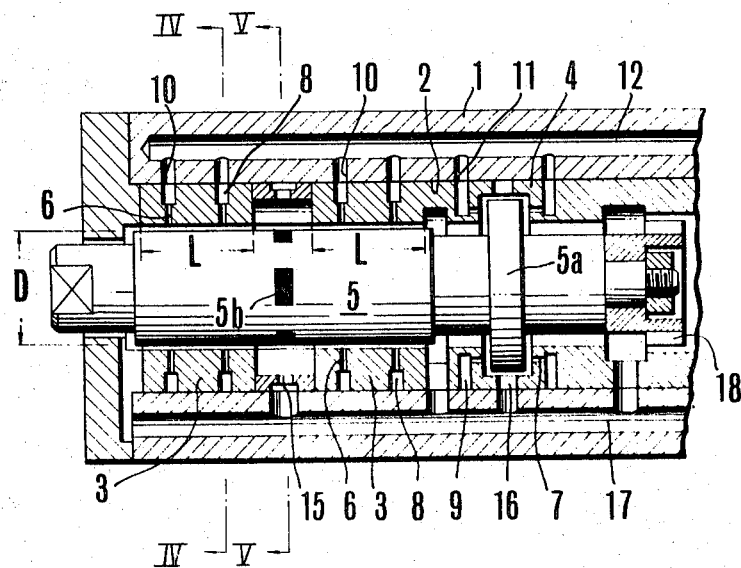
FIG. 3 shows a longitudinal section of a gas bearing embodying this invention.
Figure 4:
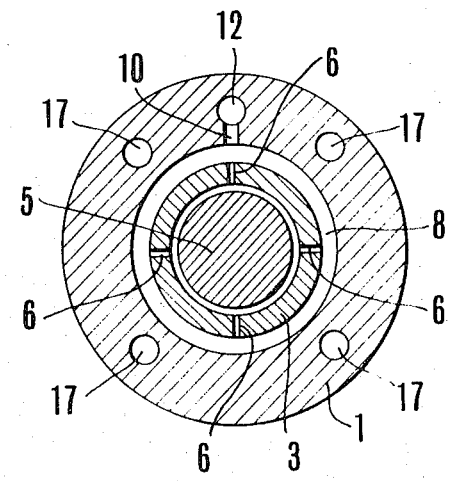
FIG. 4 is a transverse sectional view of the bearing taken along a line IV—IV in FIG. 3.

As shown in FIGS. 3 and 4, radial bearings 3, and a thrust bearing 4 are concentrically received in an axial bore 2 in a main body 1 of a gas bearing structure. A rotary shaft 5 is rotatably journaled in the radial bearings 3 and the thrust bearing 4 with small gaps between the bearings 3 and the thrust bearing 4 with small gaps between the bearings and the shaft, a flange 5a on the shaft 5 cooperating with the thrust bearing 4. The shaft is rotatably journaled by the static-supporting force of the films of the gas under pressure supplied from an external source, said supporting force being created on the surfaces of respective bearings 3 and 4. In order to provide rotary characteristics as shown in FIG. 2, it is preferably to design the length L of the bearing surface of the radial bearings 3 so that they are relatively short. Generally, this length L of the bearing surface is made to be substantially equal to or slightly less than the diameter of the rotary shaft 5.

On the inside peripheral surfaces of respective bearings 3 and 4, open equally angularly spaced small openings 6 and 7 which are connected with a gas inlet passage 12 in the main body 1 through annular grooves 8 and 9 and branch passages 10 and 11. Further, as diagrammatically depicted in FIG. 6, this inlet passage 12 is connected with a source of gas supply 14 such as a compressor through a regulator value 13 to supply gas under pressure such as air or nitrogen gas to the gaps between the bearings 3 and 4 and the shaft 5 via said small openings 6 and 7. The gas exhausted from the surfaces of respective bearings 3 and 4 is discharged into an exit passage 17 through exit ports 15 and 16 and thence to the outside of the main body 1.

A turbine 18 is secured to one end of the rotary shaft 5. The turbine is driven by the high-pressure gas supplied from the source of gas supply 14 via a pressure reducing value 19, as shown in FIG. 6, and ejected against the turbine blades through turbine nozzles (not shown) to drive the rotary shaft 5 at a high speed.

The source of gas for supplying high-speed jets to the turbine 18 may be independent of said source of supply 14 for bearing 3 and 4. Further, it should be understood that any other means may be employed to drive the shaft 5 at high speeds.

Figure 1:
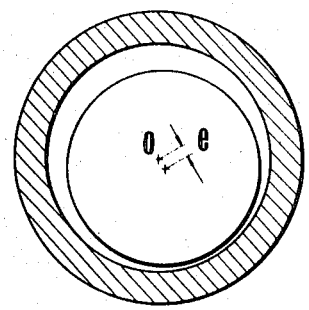
FIG. 1 is a diagram to illustrate the eccentric motion of a rotary shaft caused by the whirling phenomenon thereof.
Figure 5:
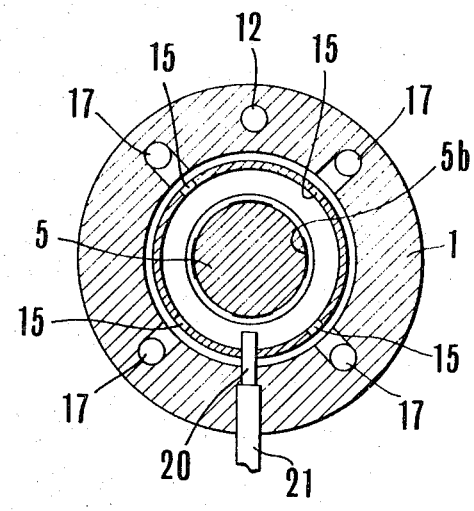
FIG. 5 is a transverse sectional view of the bearing taken along a line V—V in FIG. 3.

Further, as shown in FIG. 5, the main body 1 of the gas-bearing structure 1 is provided with a rotary detector 20 to detect the number of revolutions of the rotary shaft. For the purpose of this description, the rotary detector 20 is shown as a photoelectric detector utilizing a photoelectric element. When light is projected from a light source (not shown) upon portions of the periphery of the rotary shaft 5 including dark portions 5b through a light-transmitting pipe 21, the light is reflected again through the pipe 21 back to a photoelectric element such as a phototransistor (not shown) to generate electric pulses, the number thereof determining the number of revolutions of the rotary shaft 5. The rotary detector 20 may be replaced by any other well-known detecting means.

With reference now to FIG. 6, one example of the control system of this invention will be described. Upon detection of the number of revolutions of the rotary shaft 5 by the photoelectric detector 20, the detected digital quantity is converted into an analogue quantity by a digital-analogue converter 22, and the output thereof is supplied to a Schmidt circuit 24 through an amplifier 23. The operating point of the Schmidt circuit 24 is preset such that it will operate when the output voltage from amplifier 23 reaches a predetermined voltage level to provided an output signal effective to vary the pressure of the gas supplied to bearings 3 and 4. It is to be understood that this voltage is set to a voltage level corresponding to the number of revolutions of the shaft when it enters into the substable region after passing through the first resonance point as above described.

FIG. 7 illustrates one example of the regulator valve 13 which is controlled by the output signal from the Schmidt circuit 24 through a relay 40 to vary the pressure of the gas supplied to the bearing structure. As shown in FIG. 7 a movable valve member 29 held by two diaphragms 27 and 28 of different diameters is disposed in the lower portion 26 of the regulator valve and a spring 39 is attached to the lower end of the movable valve member 29. An upper member 30 supporting a stationary valve member 31 is secured to the lower member 26, said movable valve member 31 so as to adjust the gap therebetween. A solenoid 32 is mounted on the upper member 30 and the lower end of a movable core 34 attracted by the energization of a solenoid coil 33 extends downwardly through the stationary valve member 31 to engage the movable valve member 29. The stroke of the movable core 34 is determined by two adjustable stops 35 and 36 to set the controlled position of the movable valve member 29 to two different positions so as to vary in two steps the opening between the movable valve member 29 and the stationary valve member 31. This opening can also be varied by the adjustment of stops 35 and 36. An inlet port 37 proved through the lower valve member 26 is connected to the above-described source of gas supply and is opened to a primary pressure chamber a defined by the diaphragm 27 of smaller diameter. An outlet port 38 in the upper valve member 30 is connected with the gas inlet passage 12 and is opened to the secondary pressure chamber b defined by diaphragm 28 of larger diameter 28.

In operation, when the high-pressure gas is supplied from the source of gas supply 14 to bearings 3 and 4 through the regulator valve 13 and to the turbine 18 through the pressure reducing valve 19, the rotary shaft 5 will be driven and its speed will be increased gradually. At this time, as the solenoid 32 of the regulator valve 13 is energized to separate movable valve member 29 and stationary valve member 31 to the maximum extent, the gas introduced into the regulator valve can freely pass through the gap between these members without any appreciable resistance so that the gas is supplied under a relatively high pressure to the surfaces of bearings 3 and 4 through inlet passage 12 and small openings 6 and 7. Under such a high gas pressure, as shown in FIG. 2, it is possible to decrease as far as possible the eccentricity of the shaft at the first resonance point and to greatly improve the accuracy of rotation.

As the shaft 5 is rotated, the light projected by the source of light is reflected by the bright areas between the dark portions 5b on the outer periphery of the shaft toward the photoelectric element to produce electric pulses corresponding to the number of revolutions of the shaft. These pulses are converted from a digital quantity into an analogue quantity by the digital-analogue converter 22, the output thereof being applied to the Schmidt circuit 24 through amplifier 23. The Schmidt circuit is set to operate at a voltage level corresponding to the number of revolutions of the shaft in the substable region beyond the first resonance point. Thus, as the number of revolutions of the shaft is increased to the substable region, the Schmidt circuit 24 is changed to the ON state to energize relay 40. Thus, relay 40 deenergizes solenoid coil 33 of the regulator valve 13 to permit the gas pressure in the primary pressure chamber a and the restoring force of spring 39 to displace upwardly the movable valve member 29 until the movable core 34 engages stops 35 and 36. Then, the gap between the movable valve member 29 and the stationary valve member 31 is decreased to decrease the pressure of the gas supplied to bearings 3 and 4 thus decreasing the consumption of the gas at these bearings as well as the power for compressing the gas.

What is claimed:

1. In a high-speed gas-bearing structure comprising a gas bearing creating a static supporting force by a film of gas supplied from outside, means to supply gas under pressure to said gas bearing, a rotary shaft journaled in said gas bearing with a small gap therebetween and rotatably supported by said static supporting force of said gas film formed in said gap, means to drive said rotary shaft, the improvement which comprises means to detect the number of revolutions of said rotary shaft, a control circuit responsive to the output of said detecting means to produce an output signal when the number of revolutions of said rotary shaft reaches a substable region beyond the first resonance point and a control valve responsive to said output signal to reduce the pressure of said gas supplied to said gas bearing from said gas supply means.

2. The high-speed gas-bearing structure according to claim 1 wherein said gas bearing comprise a radial bearing and a thrust bearing and said rotary shaft is journaled in the radial and axial directions by said radial and thrust bearings.

3. The high-speed gas bearing structure according to claim 1 wherein said means for detecting the number of revolutions of said rotary shaft comprises bright and dark portions formed on the outer periphery of said rotary shaft and light projected upon said bright and dark portions is received by a photoelectric element to generate electric pulses of the number corresponding to the number of revolutions of said rotary shaft.

4. The high-speed gas bearing structure according to claim 1 wherein said control circuit comprise s a digital-analogue converter for converting a digital quantity corresponding to the number of revolutions of said rotary shaft and obtained by said detecting means into an analogue quantity, an amplifier for amplifying the output of said digital-analogue converter and a Schmidt circuit which operates when the output from said amplifier reaches a preset operating voltage level.

5. The high-speed gas bearing structure according to claim 1 wherein said control valve comprises an electromagnetic valve whereby when said electromagnetic valve is deenergized by said output signal a movable valve member is moved with respect to a stationary valve member to vary the opening therebetween to reduce the pressure of said gas supplied to said gas bearing.

6. The high-speed gas-bearing structure according to claim 5 wherein the stroke of said movable valve member operated by the excitation of said output signal is made adjustable to control the opening between said movable and stationary valve members to adjust the reduction in pressure of said pressurized gas flowing through said opening.

* * * * *